United States Patent Office

2,856,394
Patented Oct. 14, 1958

---

2,856,394

POLYISOBUTYLENE POLYMERIZATION PROCESS HAVING COARSE AND FINE MOLECULAR WEIGHT CONTROL

Augustus Bailey Small, Baton Rouge, La., and John L. Ernst, Westfield, N. J., assignors to Esso Research and Engineering Company, a corporation of Delaware No Drawing. Application October 6, 1955
Serial No. 539,015

5 Claims. (Cl. 260—94.8)

This invention relates to the production of polyisobutylene and more particularly relates to a method for controlling the molecular weight of the polyisobutylene.

It is well known to prepare polyisobutylene having a molecular weight from 80,000 to 300,000 Staudinger or higher by polymerizing isobutylene in the presence of solid metal halide catalysts such as aluminum chloride dissolved in a non-freezing, non-complex-forming solvent, such as methyl or ethyl chloride at a temperature below 0° C., preferably below —40° C., or even as low as —100 to —150° C. The actual molecular weight of the lower molecular weight polymers, e. g. 80,000 to 150,000 Staudinger is usually controlled by blending a molecular weight poison, such as diisobutylene, n-butenes, and the like with the feed in an amount adapted to give approximately the molecular weight desired. The final desired molecular weight is then obtained by varying the conversion level of the reaction. The molecular weight range for a given poison is rather wide. However, it often happens that the amounts of unavoidable poisons present in the feed stock changes. Such changes take eight to sixteen hours to pass through the system. Therefore, when attempts are made to counteract this change in composition of the feed by adjusting the amount of diisobutylene or other poison added, the lag between the time the changes are made and the time they show up in the final product is too wide spread to be a practical means of control. Furthermore, the amount of poison usually added is so small that any change which is made is within experimental limits of the usual analytical methods of control with the result that there is no real close control at all. This means that attempts to control the variables at the front end of the system are highly impractical. When higher molecular weight polymers are prepared (200,000 molecular weight and up) the poison is usually omitted.

It is therefore the major object of this invention to provide a method for controlling the molecular weight of the polyisobutylene within narrow limits.

It is a further object of this invention to provide a more flexible method for controlling the molecular weight of polyisobutylene.

These and other objects of this invention are accomplished by operating the front-end of the process at as near constant conditions as possible and controlling the molecular weight of the product by making necessary adjustments during the reaction stage of the process. Thus, in accordance with the invention a poison is added to the feed in an amount sufficient to yield a product having a molecular weight slightly in excess of that actually desired. The feed is then reacted in the presence of sufficient catalyst to give 100% conversion. The molecular weight of the product thus obtained is continuously determined and the amount of catalyst over and above that necessary to give 100% conversion is adjusted in response to any changes in the molecular weight above or below that desired whereby closer control of the product is obtained. It is thus possible to control the molecular weight within ±5000.

For example, if it is desired to prepare 100,000 molecular weight polyisobutylene, about 0.03 wt. percent of diisobutylene is added to the isobutylene feed and the polymerization carried out at —100° C. in the presence of an amount of aluminum chloride catalyst dissolved in methyl chloride sufficient to give 100% conversion. The molecular weight of the product is then determined and if found to be above or below 100,000, the amount of catalyst is adjusted to increase or decrease the molecular weight as necessary. By this means it is possible to control the molecular weight between 95,000 and 105,000.

The process to which the present invention is adapted concerns the polymerization of an isoolefin, such as isobutylene at temperatures below 0° C., preferably below —40° C. and desirably at —100 to —150° C. The isoolefin is polymerized by contacting it at the desired temperature in the presence of about 1–10 volumes, preferably 2–5 volumes of methyl chloride or other lower haloalkane of about 1–2 carbon atoms or even of vinyl chloride per volume of reactants with a solid metal halide catalyst, such as aluminum chloride, aluminum bromide, stannous chloride, zirconium tetrachloride and the like, dissolved in a portion of the same non-freezing, non-complex-forming halo-alkane solvent described above. Aluminum chloride dissolved in methyl chloride is particularly effective. The process is also applicable to the copolymerization of isobutylene and isoprene to form Butyl rubber. When extremely high molecular weight products are desired (200,000 to 300,000) it is necessary that the catalyst concentration be below 0.01%, preferably between .001 and .01% and to maintain the conversion level between 50 and 60%.

The following examples will serve to illustrate the advantages of the present invention, although it will be understood that various other embodiments or modifications not specifically illustrated herein are possible without departing from the spirit or scope of the invention.

*Example I*

To two different feeds of substantially pure isobutylene there was added 0.03 and 0.04 wt. percent of diisobutylene and each mixture was polymerized by continuously contacting it with AlCl$_3$ dissolved in methyl chloride at a temperature of about —100° C. The molecular weight of the polymer was determined at various conversion levels. The following data were obtained:

| Diisobutylene in Isobutylene Feed, wt. percent | Conv. (Wt. percent) | Molecular Wt. (Staudinger) |
|---|---|---|
| 0.03 | 75 | 180,000 |
| 0.03 | 80 | 168,000 |
| 0.03 | 90 | 135,000 |
| 0.03 | 100 | 95,000 |
| 0.04 | 75 | 155,000 |
| 0.04 | 80 | 138,000 |
| 0.04 | 90 | 100,000 |
| 0.04 | 100 | 75,000 |

*Example II*

The experiment of Example I was repeated and carried out at 100% conversion utilizing the same feed and conditions of Example I except that the catalyst concentration was varied in excess of that necessary to obtain 100% conversion in accordance with changes in the molecular weight of the product. The following data were obtained:

| Run No. | Wt. Percent Diisobutylene in Isobutylene Feed | Catalyst Conc., g./100 cc. MeCl | Catalyst Rate, cc./Min. | Conv. Wt., Percent | Mol. Wt. (Staud.) |
|---|---|---|---|---|---|
| 1 | 0.03 | 0.02 | 12 | 100 | 120,000 |
| 2 | 0.03 | 0.05 | 13 | 100 | 103,000 |
| 3 | 0.03 | 0.067 | 18 | 100 | 85,000 |

*Example III*

Example I was repeated except that the diisobutylene was omitted and the concentration of the hydrocarbon in the reactor feed was reduced to 10 wt. percent. The catalyst concentration was set initially at .01 wt. percent and the conversion at 90–95%. After the reaction began, the catalyst concentration was reduced to 0.003 to 0.004 wt. percent and the conversion was gradually reduced to 50–60%. Molecular weight samples were run on the polymer every hour and it was found that the molecular weight increased from about 74,000 to 206,000 in about four hours. By the end of the first day when conversions had reached 50–60%, polymer of 250,000+ molecular weight was being produced. The run was continued for four days and product having a molecular weight above 250,000 was produced at conversion levels of 50–60% and catalyst concentrations of 0.003 to 0.004 wt. percent. Of the entire 4-day polymer production, 88% was over 250,000 molecular weight.

The data of Examples I and II show that the molecular weight of the isobutylene polymer is a function of the conversion at a constant diisobutylene concentration in the feed. Thus, it is also evident that the molecular weight can be roughly controlled by the amount of poison added to the feed at the same conversion level. More accurate control can be obtained in accordance with Example II by maintaining the diisobutylene in the feed as constant as possible and adjusting the amount of catalyst concentration used in excess of that required for 100% conversion in response to changes in molecular weight of the polymer product. Example III shows that very high molecular weight polymer (250,000+) can be produced by leaving out the diisobutylene, maintaining a low catalyst concentration (0.003 to 0.004) and low conversion (50–60%).

The nature of the present invention having been thus fully set forth and specific examples of the same given, what is claimed as new and useful and desired to be secured by Letters Patent is:

1. In a process for the preparation of polyisobutylene wherein isobutylene feed is polymerized in the presence of a solid metal halide dissolved in a non-complex-forming, non-freezing solvent at a temperature from $-40°$ to $-150°$ C. and wherein the isobutylene feed contains a catalyst poison in an amount sufficient to give a rough control over the molecular weight of the polymer at 100% conversion, and wherein the isobutylene feed contains varying amounts of materials which lower the molecular weight of the product, the improvement which comprises carrying out the polymerization in the presence of an added excess of catalyst above that necessary to obtain 100% conversion, continuously measuring the molecular weight of the product and continuously adjusting the amount of excess catalyst added in response to changes in the molecular weight of the product whereby the molecular weight is controlled within narrow limits.

2. Process according to claim 1 wherein the catalyst is aluminum chloride dissolved in methyl chloride and the temperature is $-100°$ C.

3. Process according to claim 1 wherein the molecular weight is maintained within $\pm 5,000$.

4. In a process for the preparation of polyisobutylene having a molecular weight closely controlled within the limits of 95,000 and 105,000 in the presence of a solid metal halide dissolved in a noncomplex-forming solvent at a temperature of $-40°$ to $-150°$ C. and wherein the isobutylene feed contains varying amounts of molecular weight poisons which would cause the molecular weight to vary over wide limits, the improvement which comprises adding 0.03 wt. percent of diisobutylene to the feed whereby the molecular weight is controlled within wide limits, and carrying out the polymerization in the presence of an added excess of catalyst above that necessary to obtain 100% conversion, continuously measuring the molecular weight of the product and continuously adjusting the amount of excess catalyst added in response to changes in the molecular weight of the product whereby the molecular weight is controlled within narrow limits.

5. Process according to claim 4 wherein the catalyst is aluminum chloride dissolved in methyl chloride and the temperature is $-100°$ C.

References Cited in the file of this patent

UNITED STATES PATENTS

| 2,395,079 | Sparks et al. | Feb. 19, 1946 |
| 2,423,760 | Elmore | July 8, 1947 |
| 2,474,571 | Brakeley et al. | June 28, 1949 |
| 2,637,720 | Schneider et al. | May 5, 1953 |